(12) United States Patent
Whitlow et al.

(10) Patent No.: US 8,264,379 B2
(45) Date of Patent: Sep. 11, 2012

(54) METHODS AND SYSTEMS FOR CORRELATING DATA SOURCES FOR VEHICLE DISPLAYS (75) Inventors: Stephen Whitlow, St. Louis Park, MN (US); Thea L. Feyereisen, Hudson, WI (US); Gang He, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 754 days.

(21) Appl. No.: 12/401,460

(22) Filed: Mar. 10, 2009

(65) Prior Publication Data

US 2010/0231418 A1 Sep. 16, 2010

(51) Int. Cl.
*G01C 21/00* (2006.01)
(52) U.S. Cl. .......... 340/980; 340/945; 340/971
(58) Field of Classification Search .......... 340/945, 340/971, 980
See application file for complete search history.

(56) References Cited

U.S. PATENT DOCUMENTS

| 4,645,459 | A | 2/1987 | Graf et al. |
| 5,296,854 | A | 3/1994 | Hamilton et al. |
| 5,745,054 | A | 4/1998 | Wilkens |
| 5,838,262 | A | 11/1998 | Kershner et al. |
| 6,307,556 | B1 | 10/2001 | Ellenby et al. |
| 6,414,696 | B1 | 7/2002 | Ellenby et al. |
| 7,065,465 | B2 | 6/2006 | Chen et al. |
| 7,148,861 | B2 | 12/2006 | Yelton et al. |
| 7,161,561 | B2 | 1/2007 | Kitayama |
| 7,312,725 | B2 | 12/2007 | Berson et al. |
| 7,352,292 | B2 | 4/2008 | Alter et al. |
| 7,365,652 | B2 | 4/2008 | Scherbarth |
| 7,426,449 | B2 | 9/2008 | Henry et al. |
| 2003/0132860 | A1 | 7/2003 | Feyereisen et al. |
| 2004/0167740 | A1* | 8/2004 | Skrbina et al. ............... 702/127 |
| 2005/0232512 | A1 | 10/2005 | Luk et al. |
| 2007/0005199 | A1 | 1/2007 | He |
| 2007/0177819 | A1 | 8/2007 | Ma et al. |
| 2007/0297696 | A1* | 12/2007 | Hamza et al. ............... 382/294 |
| 2008/0158256 | A1* | 7/2008 | Russell et al. ............... 345/629 |

* cited by examiner

*Primary Examiner* — Travis Hunnings
(74) *Attorney, Agent, or Firm* — Ingrassia Fisher & Lorenz, P.C.

(57) ABSTRACT

Systems and methods are provided for displaying information on a display device associated with an aircraft. A method comprises rendering a perspective view of terrain on a display device and obtaining sensor data for a sensing region overlapping at least a portion of the viewing region. The method further comprises obtaining tracking data associated with a first object located within the sensing region and correlating a first portion of the sensor data that corresponds to the first object with the tracking data. The method further comprises rendering a graphical representation of the first object on the display device, wherein positioning of the graphical representation of the first object with respect to the terrain is influenced by the correlation with first portion of the sensor data.

19 Claims, 4 Drawing Sheets

METHODS AND SYSTEMS FOR CORRELATING DATA SOURCES FOR VEHICLE DISPLAYS

TECHNICAL FIELD

The subject matter described herein relates generally to display systems, and more particularly, embodiments of the subject matter relate to synthetic vision display systems adapted for correlating data sources for depicting objects using the most recently obtained data.

BACKGROUND

Modern flight deck displays (or cockpit displays) for vehicles (such as aircraft or spacecraft) display a considerable amount of information, such as vehicle position, speed, altitude, attitude, navigation, target, and terrain information. In the case of an aircraft, most modern displays additionally display a flight plan from different views, either a lateral view, a vertical view, or a perspective view, which can be displayed individually or simultaneously on the same display. The perspective view provides a three-dimensional view of the vehicle flight plan (or vehicle forward path) and may include various map features including, for example, weather information, terrain information, political boundaries, and navigation aids (e.g., waypoint symbols, line segments that interconnect the waypoint symbols, and range rings). The terrain information may include situational awareness (SA) terrain, as well as terrain cautions and warnings which, among other things, may indicate terrain that may obstruct the current flight path of the aircraft. In this regard, some modern flight deck display systems incorporate a synthetic terrain display, which generally represents a virtual or computer simulated view of terrain rendered in a conformal manner. The primary perspective view used in existing synthetic vision systems emulates a forward-looking cockpit viewpoint. Such a view is intuitive and provides helpful visual information to the pilot and crew.

Often, synthetic vision systems utilize onboard remote imaging sensors (e.g., radar, light detection and ranging (LIDAR), laser detection and ranging (LADAR) in military contexts, infrared (IR), ultraviolet (UV), and the like) to augment or enhance the forward-looking cockpit view and provide a visual representation of obstacles, objects, and other manmade and/or non-terrain features within the aircraft's current operating environment which may or may not be accounted for in the various databases (e.g., terrain databases, obstacle databases, airport databases, and the like) used for rendering the synthetic perspective view. These enhanced synthetic vision systems are particularly useful when operating a vehicle or aircraft in conditions of reduced visibility, such as, for example, whiteout, brownout, sea-spray, fog, smoke, low light or nighttime conditions, other inclement weather conditions, and the like. For example, an enhanced vision system may utilize real-time radar data in conjunction with one or more terrain databases to render a visualization of a landing zone for helicopter landing during brownout, such that the operator of the helicopter may ascertain the location of terrain features and various non-terrain features, such as other vehicles and buildings, that are proximate to the landing location and not represented by a priori databases.

However, current sensor-based enhanced vision systems often produce visually-noisy displays. For example, if the resolution of the sensor is too low, or the sampling rate is too slow, or the sensor performance is negatively impacted by the operating environment, the enhanced vision system may not accurately represent the size, shape, and/or particular features of an object or otherwise represent the object in an ambiguous manner. Thus, although a pilot and/or crew may utilize the enhanced vision system to recognize a likely location of an object, the pilot and/or crew are unable to glean detailed information regarding the type and/or configuration of the object. In addition, if the sensor sampling rate (i.e., the rate that the sensor updates) is too low relative to the speed of a moving object, the enhanced vision system may be unable to accurately resolve the moving object. For example, a moving object may appear to jump across the display, appear as being blurred or smeared across the display, or the size of the moving object may be exaggerated. These visually noisy displays increase the perceptual processing and mental workload of the pilot and/or crew to adequately parse the displayed information, thus reducing the potential information superiority to be gained from the enhanced vision system.

BRIEF SUMMARY

A method is provided for displaying information on a display device associated with a vehicle. The method comprises rendering a perspective view of terrain on the display device, the perspective view of terrain being based on a set of terrain data corresponding to a viewing region proximate the vehicle. The method further comprises obtaining sensor data for a sensing region overlapping at least a portion of the viewing region and obtaining tracking data associated with a first object located within the sensing region. The tracking data is based on a tracking signal associated with the first object. The method further comprises correlating a first portion of the sensor data corresponding to the first object and the tracking data and rendering a graphical representation of the first object on the display device. The graphical representation of the first object is rendered overlying the perspective view of terrain, wherein the positioning of the graphical representation of the first object with respect to the terrain is influenced by the correlation with first portion of the sensor data.

In another embodiment, a display system for an aircraft is provided. The display system comprises a display device, an onboard sensor system configured to obtain sensor data for a first object located within a viewing region proximate the aircraft, and a communications system configured to obtain tracking data for the first object. The tracking data is based on a tracking signal associated with the first object. The display system further comprises a processing architecture coupled to the communications system and the onboard sensor system, and a graphics system coupled to the processing architecture and the display device. The graphics system and the processing architecture are cooperatively configured to render a primary flight display on the display device, render, in a portion of the primary flight display, a graphical representation of the sensor data for the first object, and render, in a portion of the primary flight display, a first symbology overlying the synthetic perspective view of terrain. The primary flight display comprises a synthetic perspective view of terrain for the viewing region, and wherein the synthetic perspective view of terrain corresponds to a flight deck viewpoint. The first symbology is based on the tracking data such that the first symbology is representative of the first object, and the first symbology is positioned overlying the terrain in a manner that is influenced by the sensor data for the first object.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the subject matter will hereinafter be described in conjunction with the following drawing figures, wherein like numerals denote like elements.

DETAILED DESCRIPTION

The following detailed description is merely exemplary in nature and is not intended to limit the subject matter of the application and uses thereof. Furthermore, there is no intention to be bound by any theory presented in the preceding background or the following detailed description.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting. For example, the terms "first", "second" and other such numerical terms referring to structures do not imply a sequence or order unless clearly indicated by the context For the sake of brevity, conventional techniques related to graphics and image processing, navigation, flight planning, aircraft controls, object and/or vehicle tracking systems, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Technologies and concepts discussed herein relate to display systems adapted for displaying, on a display device associated with an aircraft, symbology representative of an object overlying a synthetic perspective view of terrain for a region proximate the aircraft in response to a tracking signal associated with the object. In an exemplary embodiment, a tracking signal associated with the object is correlated with real-time sensor data corresponding to the object. The tracking signal is utilized to identify various physical characteristics or features of the object that may not be resolvable by the sensors (e.g., due to the sensor resolution or speed of the object) such that the symbology representative of the object accurately reflects the real-world geometric and/or physical characteristics of the object. Because the tracking signal is generally refreshed and/or updated at a lower rate than the sensor data, the sensor data is utilized to display the symbology with respect to the terrain in a manner that reflects the more recently obtained data regarding the object position (i.e., the sensor data), such that the symbology is positioned based on the most recently obtained data. By correlating the sensor data and the tracking signal, the display more accurately reflects the geometric and/or physical characteristics of the object along with the most recent position of the object. Thus, the pilot and/or crew may be accurately identify the location of an object and glean information pertaining to the type and/or configuration of the object type in a quick and intuitive manner.

Figure 1:
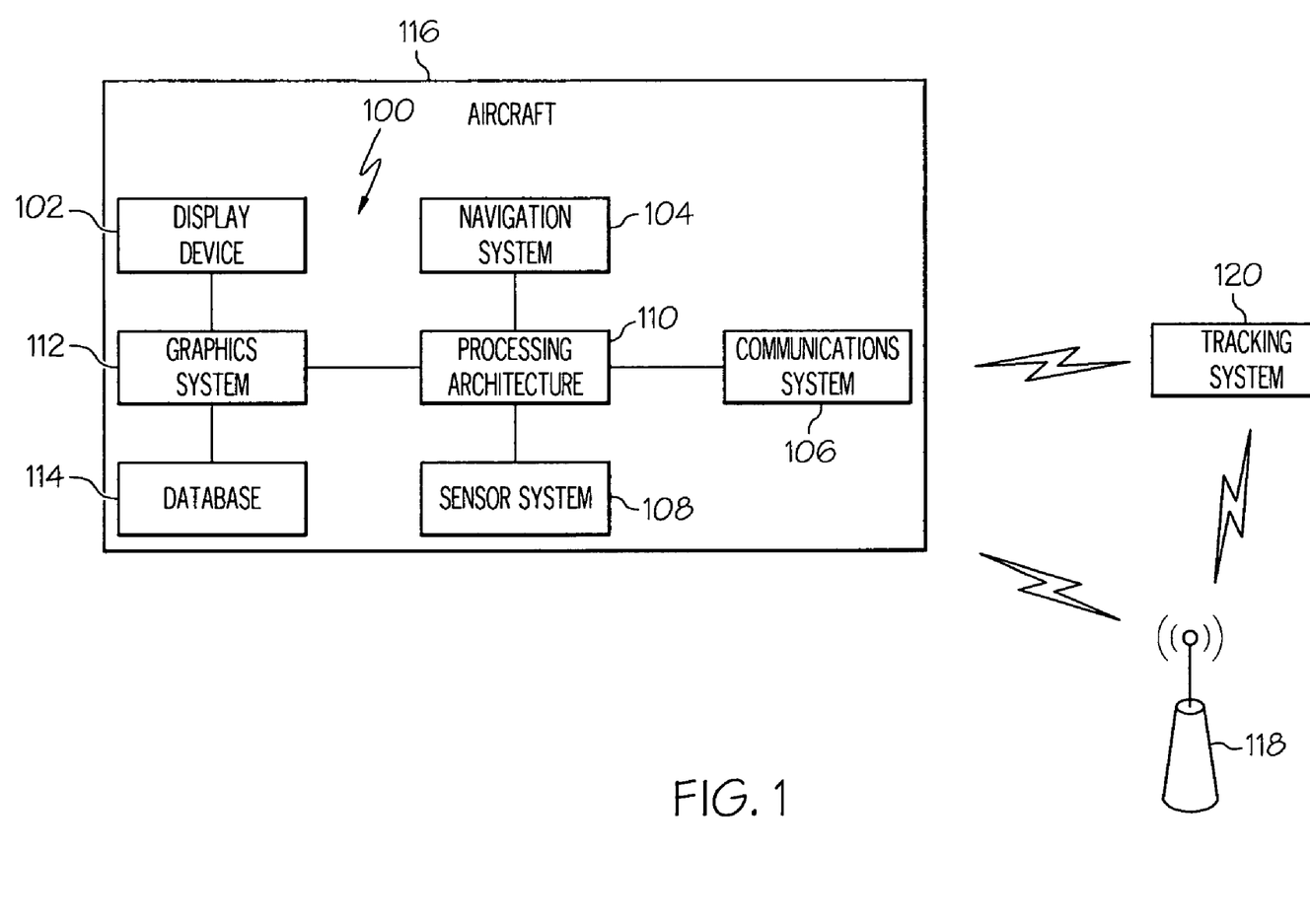
FIG. 1 is a block diagram of a display system suitable for use in an aircraft in accordance with one embodiment.

FIG. 1 depicts an exemplary embodiment of a display system 100. In an exemplary embodiment, the display system 100 is located onboard a vehicle such as an aircraft 116. In an exemplary embodiment, the display system 100 includes, without limitation, a display device 102, a navigation system 104, a communications system 106, a sensor system 108, a processing architecture 110, and a graphics system 112. The display system 100 further includes one or more databases 114 suitably configured to support operation of the display system 100, as described in greater detail below. It should be understood that FIG. 1 is a simplified representation of a display system 100 for purposes of explanation and ease of description, and FIG. 1 is not intended to limit the application or scope of the subject matter in any way. In practice, the display system 100 and/or aircraft 116 will include numerous other devices and components for providing additional functions and features, as will be appreciated in the art. Furthermore, although the display system 100 is described herein in an aviation context, the display system 100 may be located onboard and/or associated with other vehicles, such as, ground-based vehicles or maritime vessels.

In an exemplary embodiment, the display device 102 is coupled to the graphics system 112. The graphics system 112 is coupled to the processing architecture 110, and the processing architecture 110 and the graphics system 112 are cooperatively configured to display, render, or otherwise convey one or more graphical representations or images associated with operation of the aircraft 116 on the display device 102, as described in greater detail below. The processing architecture 110 is coupled to the navigation system 104 for obtaining real-time navigational data and/or information regarding operation of the aircraft 116 to support operation of the processing architecture 110. In an exemplary embodiment, the communications system 106 is coupled to the processing architecture 110 and configured to support communications between the aircraft 116 and a tracking transmitter 118 and/or tracking system 120, as described in greater detail below. The sensor system 108 is coupled to the processing architecture 110 and adapted to obtain sensor data for a region proximate the aircraft 116, as described in greater detail below.

In an exemplary embodiment, the display device 102 is realized as an electronic display configured to graphically display flight information or other data associated with operation of the aircraft 116 under control of the graphics system 112. In an exemplary embodiment, the display device 102 is located within a cockpit of the aircraft 116. It will be appreciated that although FIG. 1 shows a single display device 102, in practice, additional display devices may be present onboard the aircraft 116. In addition, although FIG. 1 shows the display device 102 within the aircraft 116, in practice, the display device 102 may be located outside the aircraft 116 (e.g., on the ground as part of an air traffic control center or another command center) and communicatively coupled to the remaining elements of the display system 100 (e.g., via a data link).

In an exemplary embodiment, the navigation system 104 is configured to obtain one or more navigational parameters associated with operation of the aircraft 116. The navigation system 104 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 104, as will be appreciated in the art. In an exemplary embodiment, the navigation system 104 and the processing architecture 110 are cooperatively configured to obtain and/or determine the current location of the aircraft 116 (e.g., the latitude and longitude), altitude or above ground level, and the heading of the aircraft 116 (i.e., the direction the aircraft is traveling in relative to some reference) during operation of the aircraft 116.

In an exemplary embodiment, the communications system 106 is suitably configured to support communications between the aircraft 116 and a tracking transmitter 118 and/or a tracking system 120. In an exemplary embodiment, the tracking transmitter 118 is realized as a radio transmitter that is associated with an object (e.g., a person, vehicle, vessel, aircraft, or another suitable object) and emits one or more tracking signals, which may be used to determine the position (or location) of the tracking transmitter 118. In this regard, depending on the embodiment, the communications system 106 may be adapted to obtain and/or receive the tracking signal (or the information embodied therein) either directly from the tracking transmitter 118 or indirectly via a tracking system 120. The tracking transmitter 118 and/or tracking system 120 may be compatible with a civilian or military tracking system, such as the Blue Force Tracking system, as will be appreciated in the art. Various aspects of transmitter-based tracking systems are well known and so, in the interest of brevity, will only be mentioned briefly herein or will be omitted entirely without providing the well known details. As described in greater detail below, the display system 100 utilizes information obtained from the one or more tracking signals emitted by the tracking transmitter 118 to determine the position (or location) of the transmitter 118 and the type or class of object associated with the transmitter.

The tracking transmitter 118 preferably emits tracking signals at regular intervals, such that the position of the tracking transmitter 118 may be updated and/or determined at substantially fixed refresh rate (or alternatively, refresh frequency). For example, some older generation tracking transmitters are configured to emit tracking signals at approximately five minute intervals, whereas other tracking transmitters are configured to emit tracking signals at approximately one second intervals (e.g., a refresh frequency of one hertz). In an exemplary embodiment, the tracking signal includes identification information (or an identifier) which may be utilized by the display system 100 to identify or otherwise establish an association between the tracking transmitter 118 and the particular object associated with the tracking transmitter 118. In an exemplary embodiment, the identification information is utilized to identify the type or class of object (e.g., humvee, tank, armored personnel carrier, foot soldier, and the like) associated with the tracking transmitter 118. Depending on the embodiment, the tracking signal may also include information that may be used to identify the particular configuration of the object, or additional physical attributes or protuberances associated with the object (e.g., an antenna, a missile battery, a radar disk, and the like). In this regard, the display system 100 and/or tracking system 120 may include a database that maintains the association between the tracking transmitter 118 (e.g., using an identifier for the tracking transmitter 118 that is encapsulated in the tracking signal) and the type and/or identity of the object or vehicle associated with the tracking transmitter 118.

In an exemplary embodiment, the sensor system 108 is configured to obtain sensor data pertaining to a sensing region proximate the aircraft 116. It should be noted that although FIG. 1 depicts a single sensor system 108 onboard the aircraft 116, in practice, a plurality of sensor systems may be present. The processing architecture 110 and/or graphics system 112 are cooperatively configured to utilize the sensor data to augment and/or enhance a synthetic perspective view of primary flight display rendered on the display device 102, thereby enhancing the situational awareness and/or accuracy of the primary flight display. For example, the sensor system 108 may comprise one or more imaging sensors, such as visible, low-light TV, infrared, light detection and ranging (LIDAR) or laser detection and ranging (LADAR), infrared (IR), ultraviolet (UV), or radar-type sensors that collect and/or obtain real-time data pertaining to the physical features of the land and/or objects in the sensing region which is used to augment or enhance a forward-looking cockpit view of the sensing region, as described in greater detail below. In an exemplary embodiment, the sensor system 108 comprises a radar sensor that transmits radar pulses and receives reflected echoes, which can be amplified to generate a radar signal. The radar signals can then be processed to generate three-dimensional orthogonal coordinate information having a horizontal coordinate, vertical coordinate, and depth or elevation coordinate. The coordinate information can be stored and/or processed for display on the display device 102, as described in greater detail below. In an exemplary embodiment, the sensor system 108 obtains and/or updates sensor data for the sensing region with a particular frequency, such that the sensor data is effectively represents the real-time status of the sensing region. For example, a typical radar sensor system generally operates with a frequency ranging from about tens of GHz to one hundred GHz or more. In this regard, the sensor data may be referred to as real-time sensor data, even though the sensor data may not be obtained in a perfectly continuous or real-time manner.

Figure 2:
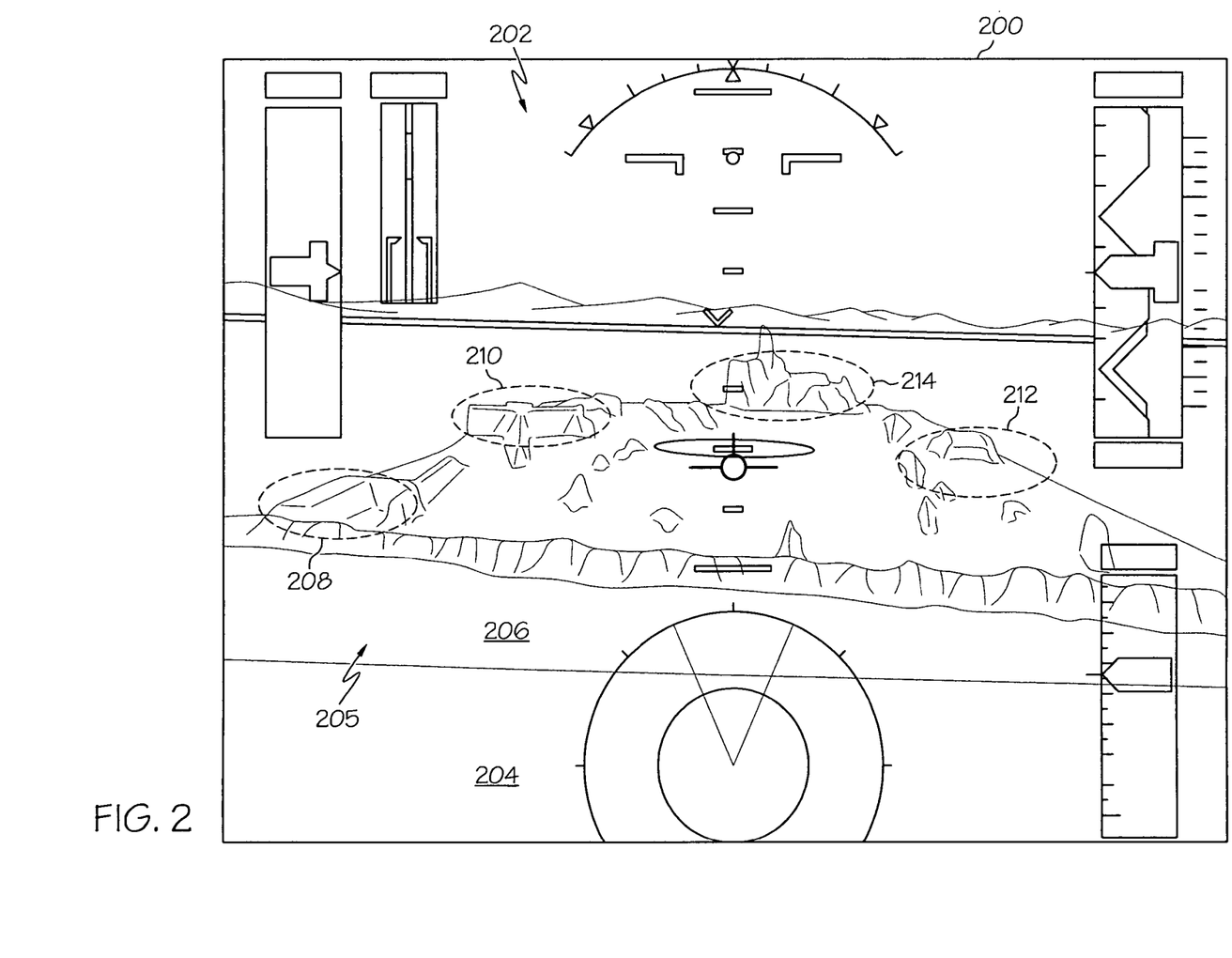
FIG. 2 is an exemplary flight deck display, including a synthetic perspective view of terrain and sensor data, suitable for use with the data source correlation process of FIG. 3 in accordance with one embodiment.

Referring now to FIG. 2, and with continued reference to FIG. 1, in an exemplary embodiment, the processing architecture 110 and the graphics system 112 are cooperatively configured to control the rendering of a flight deck display 200 on the display device 102. As shown in FIG. 2, in an exemplary embodiment, the flight deck display 200 includes a primary flight display 202. The synthetic perspective view of primary flight display 202 provides useful and intuitive information to the flight crew in a simple graphical manner, as will be appreciated in the art and described in greater detail below. Although not a requirement, the general positioning, size, boundaries, and orientation of primary flight display 202 within flight deck display 200 remain fixed during operation. It should be appreciated that flight deck display 200 as depicted in FIG. 2 represents the state of a dynamic display frozen at one particular time, and that the flight deck display 200 may be continuously refreshed during operation of the aircraft 116.

In the illustrated embodiment, primary flight display 202 includes several features that are graphically rendered, including, without limitation a synthetic perspective view of terrain 204 and a graphical representation of sensor data 206 obtained for a sensing region 205 proximate the aircraft, as described in greater detail below. In this regard, the graphical representation of the sensor data 206 is positioned within the primary flight display 202 overlying the terrain 204 in a manner that accurately reflects and/or corresponds to the approximate real-world location of the sensor data with respect to the terrain 204. For the sake of clarity, simplicity, and brevity, the additional graphical elements of the primary flight display 202 (e.g., pilot guidance elements, altimeters, airspeed indicators, and the like) will not be described herein.

In an exemplary embodiment, the terrain 204 is based on a set of terrain data that corresponds to a region proximate the current location of aircraft. The graphics system 112 includes or otherwise accesses one or more databases 114, and in conjunction with navigational information from processing architecture 110 and/or navigation system 104, the graphics system 112 controls the rendering of the terrain 204 on the display device 102 and updates the set of terrain data being used for rendering as needed as the aircraft 116 travels. In this regard, the display system 100 includes one more databases 114 to rendering of the flight deck display 200 including, for example, a terrain database, a geopolitical database, a navigational aid (or NAVAID) database, an obstacle database, a marine database, or another other suitable commercial or military database.

As shown, in an exemplary embodiment, the graphics system 112 is configured to render the terrain 204 in a perspective or three dimensional view that corresponds to a flight deck (cockpit) viewpoint. In other words, terrain 204 is displayed in a graphical manner that simulates a flight deck viewpoint, that is, the vantage point of a person in the cockpit of the aircraft. Thus, features of terrain 204 are displayed in a conformal manner, relative to the earth. For example, the relative elevations and altitudes of features in terrain 204 are displayed in a virtual manner that emulates reality. Moreover, as the aircraft navigates (e.g., turns, ascends, descends, rolls, etc.), the graphical representation of terrain 204 and other features of the perspective display can shift to provide a continuously updated virtual representation for the flight crew. It should be appreciated that although the perspective view associated with primary flight display 202 need not always include a perspective view of terrain 204. For example, in the absence of terrain data, the perspective view of the display may appear flat, blank, or otherwise void of conformal terrain graphics.

Figure 3:
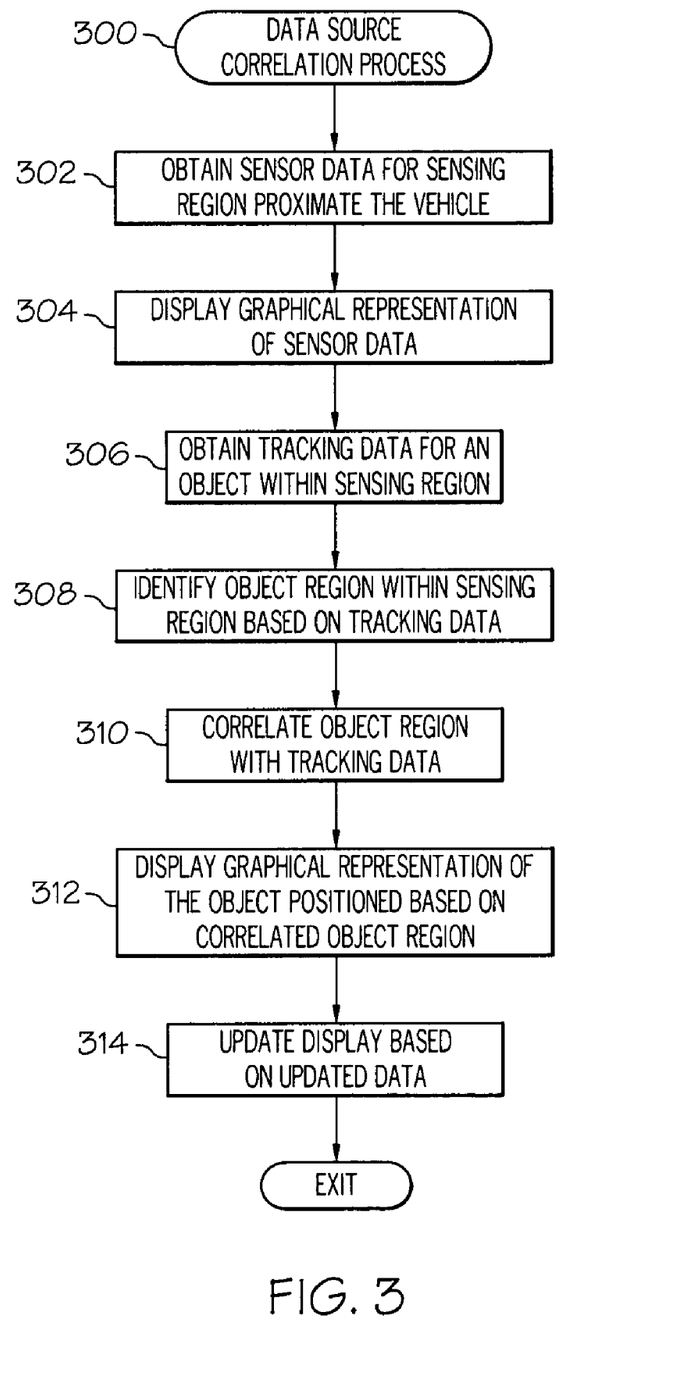
FIG. 3 is a flow diagram of an exemplary data source correlation process suitable for use with the display system of FIG. 1 and the flight deck display of FIG. 2 in accordance with one embodiment.

Referring now to FIG. 3, in an exemplary embodiment, a display system 100 may be configured to perform a data source correlation process 300 and additional tasks, functions, and operations described below. The various tasks may be performed by software, hardware, firmware, or any combination thereof For illustrative purposes, the following description may refer to elements mentioned above in connection with FIG. 1. In practice, the tasks, functions, and operations may be performed by different elements of the described system, such as the display device 102, the navigation system 104, the communications system 106, the sensor system 108, the processing architecture 110, the graphics system 112, or the database 114. It should be appreciated that any number of additional or alternative tasks may be included, and may be incorporated into a more comprehensive procedure or process having additional functionality not described in detail herein.

Referring again to FIG. 3, and with continued reference to FIG. 1 and FIG. 2, a data source correlation process 300 may be performed to display or present symbology representative of an object associated with a tracking transmitter on a display device in conjunction with the sensor data corresponding to the object. In this regard, the information derived from tracking signals emitted by the tracking transmitter may be utilized to disambiguate real-time sensor data into a depiction of the object in a virtual manner that emulates reality, while simultaneously utilizing the sensor data for the most recent positional information of the object. In an exemplary embodiment, the data source correlation process 300 initializes or begins by obtaining sensor data for a sensing region proximate the current position of the aircraft and displaying and/or rendering a graphical representation of the sensor data on a display device associated with the aircraft (tasks 302, 304). In this regard, the sensing region overlaps at least a portion of the forward-looking viewing region defined by the flight deck viewpoint, for example, as shown in FIG. 2, the sensor system 108 may obtain sensor data for a sensing region 205 within the flight deck viewpoint of the primary flight display 202. It should be appreciated that the size and/or orientation of the sensing region 205 relative to the aircraft 116 will depend on the particular type and configuration of the sensor system (e.g., sensor system 108) onboard the aircraft 116. The processing architecture 110 and/or graphics system 112 are cooperatively configured to render a three-dimensional perspective view of terrain 204 for the viewing region proximate the aircraft and render a graphical representation of the obtained sensor data 206 for the sensing region 205 in conjunction with the terrain 204, that is, the obtained sensor data 206 is rendered overlying and/or overlapping the terrain 204 or integrated and/or embedded within the terrain 204. The sensor data 206 is preferably rendered and/or displayed in a conformal manner relative to the earth such that the positioning and/or dimensions of the graphical representation of sensor data 206 over the terrain 204 accurately reflects the positioning and/or dimensions of the sensing region 205 relative to the aircraft 116. In this manner, if the sensor system 108 comprises a radar sensor configured to process radar signals to generate three-dimensional orthogonal coordinate information for the sensor data 206, the relative elevations and altitudes (e.g., the depth or elevation coordinates) corresponding to features and/or objects within the sensing region 205 are displayed in a virtual manner that emulates reality. In an exemplary embodiment, the graphical representation of the obtained sensor data 206 for the sensing region 205 is rendered overlying and/or overlapping the terrain 204, however, in some embodiments, the graphical representation of the obtained sensor data 206 for the sensing region 205 may be integrated and/or embedded with the terrain 204.

In an exemplary embodiment, the data source correlation process 300 continues by obtaining and/or receiving tracking data for an object proximate the aircraft and within the sensing region (task 306). As used herein, tracking data for an object should be understood as comprising information derived from or otherwise based on one or more tracking signals emitted by a tracking transmitter associated with the object. In an exemplary embodiment, the object (e.g., a vehicle, vessel, person, building) is physically associated with the tracking transmitter (e.g., a tracking transmitter onboard the vehicle) which has previously emitted (or is currently emitting) a tracking signal from which the tracking data is derived or otherwise determined.

In an exemplary embodiment, the tracking data comprises positional information and identification information for the tracking transmitter. As described in greater detail below, the identification information may be utilized to identify the type or class of object associated with the tracking signal. The positional information may be utilized to determine the approximate real-world position (or location) of the source of the tracking signal, that is, the location of the tracking transmitter associated with the particular object, and hence, the location of the particular object. For example, in accordance with one embodiment, the display system and/or aircraft may receive tracking signals directly from the tracking transmitter associated with the object and determine or otherwise obtain positional data for the object based on the tracking signal. In this regard, positional data comprises data and/or information (e.g., latitude and longitude, GPS coordinates, altitude, and the like) used to identify the approximate real-world location or position of the object. In accordance with one embodiment, the positional data for the tracking transmitter may be encapsulated or otherwise contained within the tracking signal emitted by the tracking transmitter. For example, the tracking transmitter may have knowledge regarding its own positioning in cooperation with the tracking system and/or GPS. In other embodiments, the positional data may be calculated by the tracking system and transmitted to the aircraft. For example, the tracking system may determine and/or calculate (e.g., via triangulation, trilateration, GPS techniques, and the like) the position of the object by performing triangulation on a tracking signal received by a plurality of satellites and transmit a signal to the aircraft that contains the positional data for the tracking transmitter. In this manner, the aircraft may determine and/or identify positional data for the object based on the contents of a signal obtained from the tracking system.

In an exemplary embodiment, in response to obtaining tracking data for an object, the data source correlation process 300 continues by identifying an object region within the sensing region that corresponds to the object based on the tracking data (task 308). In this regard, the object region comprises a portion or subset of the sensor data for the sensing region that is indicative of the object associated with the tracking signal. Depending on the embodiment, the object region may coincide with the sensing region (e.g., the entire sensing region may be indicative of the object), and in this regard, it should be understood that the term subset as used herein is not intended to be construed as implying or requiring the object region be a strict or proper subset of the sensing region. In an exemplary embodiment, the data source correlation process 300 determines and/or identifies the object region that corresponds to the object based on the tracking data.

For example, referring to FIG. 2, the data source correlation process 300 may identify a first object region 208 using positional data derived from a tracking signal associated with (or corresponding to) a first object within the sensing region 205. In this regard, the data source correlation process 300 may identify and/or determine the subset of the sensor data 208 corresponds to the first object by performing image processing and/or pattern recognition on the sensor data 206. For example, the data source correlation process 300 may process the sensor data 206 and identify and/or recognize the first object region 208 as corresponding to the first object based on the object region being within a threshold distance (e.g., ten feet) of the positional data for the first object. It will be appreciated in the art that the threshold distance chosen for a particular application will likely vary depending on the sensor sensitivity, accuracy and/or other performance characteristics, the field of view of the primary flight display, and/or other factors. In this regard, the data source correlation process 300 identifies a particular region of the sensor data that is indicative of an object for which the data source correlation process 300 has received tracking data. In another embodiment, the data source correlation process 300 identifies the object region based on the identification information from the tracking data. In this regard, if the identification information indicates a particular type of object, the data source correlation process 300 may performing image processing and/or pattern recognition on the sensor data and attempt to identify a subset of the sensor data that matches a previously identified and/or determined sensor data pattern for the particular type of object. For example, if the tracking data identifies the object as a tank, the data source correlation process 300 may parse the sensor data and try to identify a subset which matches a pattern of sensor data known to correspond to a tank. In accordance with yet another embodiment, the data source correlation process 300 may be adapted to allow a user to manually identify an object region corresponding to a particular object, by allowing the user to select an object region on the display device via a suitably configured user interface. The data source correlation process 300 may identify additional object regions 210, 212, 214 which correspond to additional objects based on tracking data associated with (or corresponding to) the additional objects within the sensing region 205.

In an exemplary embodiment, the data source correlation process 300 continues by correlating the object region with the tracking data and rendering and/or displaying a graphical representation of the object associated with the tracking data (or tracking signal), wherein the graphical representation of the object is positioned based on the correlated object region (tasks 310, 312). The data source correlation process 300 correlates the sensor data for an object (e.g., the object region) and the tracking data for the object by establishing and/or maintaining an association between the tracking data and the sensor data, such that the sensor data or the tracking data may be effectively fused or coalesced to provide a more accurate representation of object and its current position. For example, the identification information from the tracking data may be associated with (e.g., tagged or assigned to) the sensor data for the object region. In this regard, the processing architecture 110 and/or graphics system 112 may implement a database and/or a data structure that maintains an association between the identification information for the tracking data (e.g., the identification information contained within the tracking signal) and the subset of the sensor data that corresponds to the object region. For example, the processing architecture 110 and/or graphics system 112 may implement a sensor data object for the object region which is tagged with (or contains) the identification information from the tracking data for the object. In this manner, the data source correlation process 300 establishes an association between the object region and the tracking data for purposes of rendering and/or displaying on the display device. In an exemplary embodiment, the positioning of the graphical representation of the object is influenced by the position of the correlated object region and vice versa, as described in greater detail below.

In an exemplary embodiment, the graphical representation of the object comprises a first symbology that is representative and/or indicative of the particular object associated with the tracking data. As described in greater detail below, the first symbology may be realized as a previously obtained image, photo, icon, template, or another graphic representative of the object which is stored and/or maintained by the processing architecture 110 and/or graphics system 112. In an exemplary embodiment, the symbology for the object associated with the tracking data is rendered and/or displayed within the primary flight display at a position such that it overlaps at least a portion of the correlated and/or associated object region. As a result, a user may visually (or mentally) associate and/or correlate the sensor data and the tracking data on the primary flight display. In this manner, the identification information may be utilized to more accurately identify and represent to object on the display while the more recently obtained or more accurate (e.g., relative to the accuracy of the positional information from the tracking data) sensor data may be used to more accurately position the graphical representation of the object on the display with respect to the terrain. In addition, in some embodiments, the once the sensor data for an object region is correlated with an object, the sensor data for the object region may be filtered or otherwise altered to remove higher frequency visual noise and/or smooth edges within the object region, such that the graphical representation of the object region is less noisy and more easily analyzed.

Figure 4:
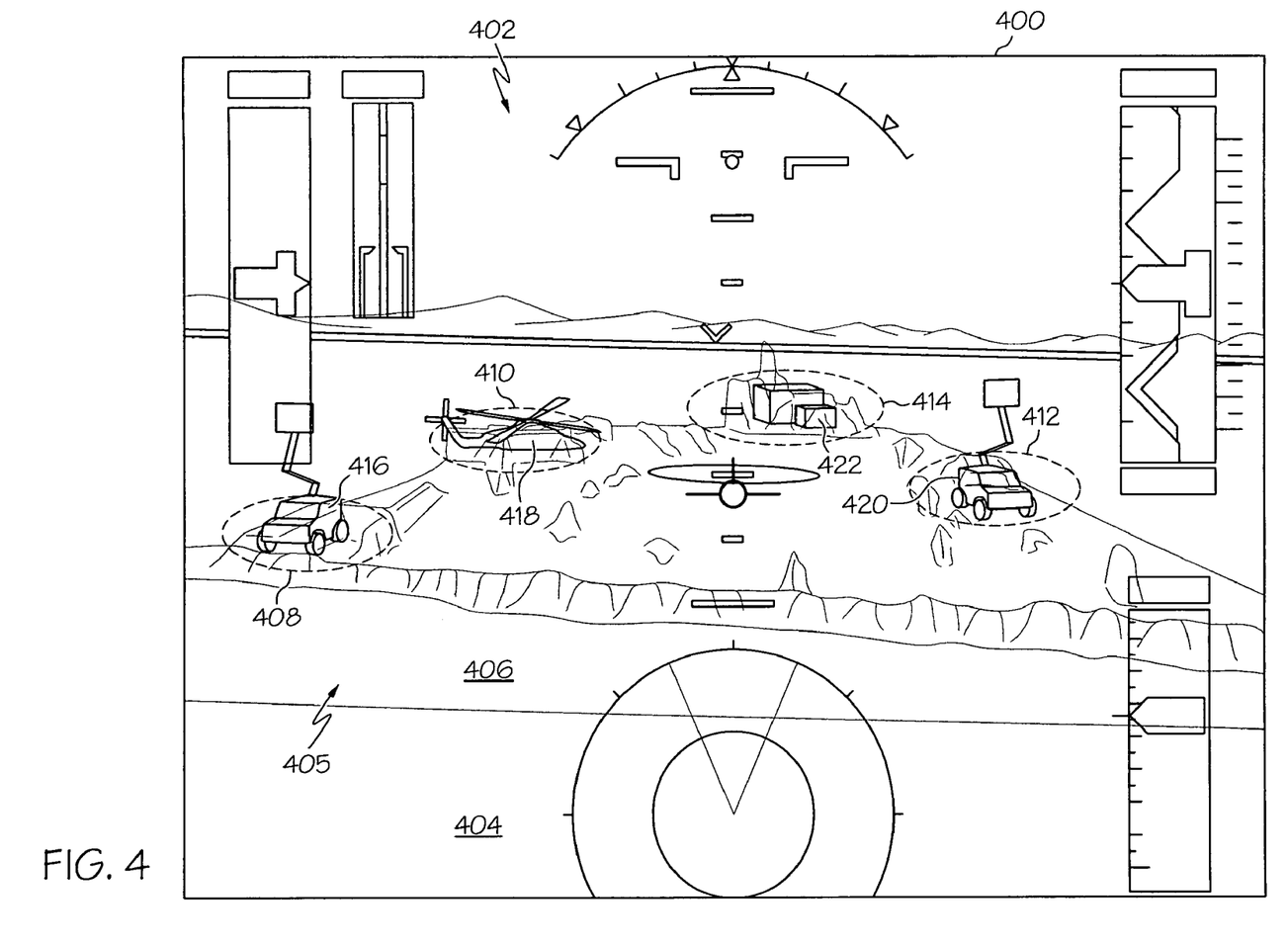
FIG. 4 is an exemplary flight deck display suitable for use with the data source correlation process of FIG. 3 in accordance with one embodiment.

For example, referring now to FIG. 4 and with continued reference to FIGS. 1-3, in an exemplary embodiment, the data source correlation process 300 renders a flight deck display 400 including a primary flight display 402 comprising a synthetic perspective view of terrain 404, a graphical representation of sensor data 406 obtained for a sensing region 405 proximate the aircraft, and graphical representations of objects 416, 418, 420, 422 having associated tracking data. In an exemplary embodiment, each object 416, 418, 420, 422 is positioned within the primary flight display 402 overlying the terrain 404 in a manner that is influenced by the respective object region 408, 410, 412, 414 that is correlated to the tracking data for a respective object 416, 418, 420, 422. For example, the aircraft 116 may obtain and/or receive tracking data corresponding to (or associated with) a first object proximate the aircraft and subsequently identify or determine that the first object (or the tracking transmitter associated with the first object) is within a threshold distance of an identified object region 408 based on the tracking data for the first object (tasks 306, 308, 310). In response, the data source correlation process 300 may correlate the tracking data for the first object and the object region 408 by making an association (e.g., using a database and/or suitably configured data structure) between the identification information for the tracking data and the subset of the sensor data that corresponds to the object region 408.

The data source correlation process 300 continues by displaying and/or rendering a graphical representation of the first object 416 in the primary flight display 402 in a manner that is influenced by the position of the correlated object region 408. In an exemplary embodiment, the first object 416 is rendered and/or displayed such that it overlaps at least a portion of the correlated object region 408. In accordance with one or more embodiments, the first object 416 may be positioned at the center of the correlated object region 408, wherein the center may be determined geometrically (i.e., based on the shape of the object region 408) or by weighted averaging methods (i.e., based on the quantity and distribution of the sensor data). In this manner, the positioning of the first object 416 overlying the terrain 404 reflects the real-time real-world positioning of the object based on the real-time sensor data (e.g., the correlated object region 408) obtained by the sensor system 108. In yet another embodiment, if the positional data for the first object 416 corresponds to a position within the correlated object region 408, the first object 416 is positioned within the correlated object region 408 at the position or location indicated by the tracking data for the object.

Depending on the embodiment, the first object 416 may be rendered overlying the object region 408 (e.g., layered on top of the sensor data), or alternatively, the object region 408 may be rendered overlying the first object 416. In addition, in accordance with one or more embodiments, the first object 416 is rendered using a visually distinguishable characteristic such that a user can distinguish between the first object 416 and the sensor data for the object region 408. Depending on the embodiment, the visually distinguishable characteristic may be realized by using one more of the following: color, hue, tint, brightness, graphically depicted texture or pattern, contrast, transparency, opacity, shading, animation (e.g., strobing, flickering or flashing), and/or other graphical effects. In an exemplary embodiment, the first object 416 is rendered transparently overlying the object region 408 such that a user can visually distinguish both the object region 408 and the first object 416 when viewing the primary flight display 402. In some embodiments, the data source correlation process 300 may be adapted to allow a pilot and/or user to manually select and/or vary the visually distinguishable characteristics used in rendering the first object 416 as desired.

In an exemplary embodiment, the data source correlation process 300 renders a three-dimensional perspective view of the object associated with the tracking signal using a symbology that reflects the physical features and/or geometric characteristics of the object. In this regard, the symbology may comprise an image, icon, graphic, template, and/or various combinations thereof that is chosen and/or designed to accurately reflect the physical features and/or geometric characteristics of the particular object. In accordance with one or more embodiments, the processing architecture 110 and/or graphics system 112 stores and/or maintains symbology corresponding to each type or class of object. For example, the data source correlation process 300 may identify the type or class of the object based on the identification information contained in the tracking data. For example, as described above, the aircraft 116 and/or tracking system 120 may include a database that maintains the association between a tracking transmitter and the type and/or identity of the object or vehicle associated with the tracking transmitter. In this regard, the object associated with the tracking transmitter (or tracking data) may be classified based on the type of vehicle and/or vessel, the type of cargo, the size of the vehicle and/or vessel, the amount of persons associated with a particular object, or another suitable classification criterion. For example, as shown in FIG. 4, the data source correlation process 300 may classify and/or identify the first object 416 as a jeep, and in response, render the graphical representation of the first object 416 using a symbology that is indicative or representative of a typical jeep. In other words, the symbology 416 for the first object replicates how the first object would appear as if there were unlimited visibility. In addition, the data source correlation process 300 may identify the particular configuration of the object, or additional physical attributes or protuberances associated with the object (e.g., an antenna, a missile battery, a radar disk), and modify or otherwise adapt the symbology to reflect the particular physical features of the object. For example, as shown, the first object is rendered using a symbology 416 indicative of a jeep having an antenna fixed to the roof. In alternative embodiments, the data source correlation process 300 may identify and/or determine the physical characteristics of the object based on the sensor data for the object region 408, for example, by processing and/or performing pattern recognition on the object region 408 to identify physical features of the first object and modify the symbology accordingly. In yet another embodiment, the data source correlation process 300 may identify the particular object and utilize pre-stored images and/or photos of the particular object that are stored and/or maintained in a database and associated with the tracking transmitter onboard the particular object.

In a similar manner, the data source correlation process 300 may be performed for additional objects 418, 420, 422 having associated tracking data within the sensing region 405. As shown in FIG. 4, a second object region 410 corresponds to a second object 418, wherein in response to determining and/or identifying the second object as a helicopter, the data source correlation process 300 renders the graphical representation of the second object using a symbology 418 representative of a helicopter and overlapping at least a portion of the second object region 410. A third object region 412 corresponds to a third object 420, wherein in response to determining and/or identifying the third object as a humvee having an antenna, the data source correlation process 300 renders the graphical representation of the third object using a symbology 420 representative of a humvee with an antenna on its roof and overlapping at least a portion of the third object region 412. Similarly, a fourth object region 414 corresponds to a fourth object 422, wherein in response to determining and/or identifying the fourth object is a building, the data source correlation process 300 renders the graphical representation of the fourth object using a symbology 422 representative of a building and overlapping at least a portion of the fourth object region 414.

In an exemplary embodiment, the symbology for an object associated with the tracking data is rendered in a conformal manner with respect to the terrain, such that it accurately reflects the real-world size and position of the object relative to the aircraft. In this manner, the symbology representative of the object is displayed in a graphical manner that simulates the vantage point of a person in the cockpit of the aircraft (i.e., representative of the flight deck viewpoint during conditions of unlimited out the window visibility). In other words, the height and/or width of the object are displayed in a virtual manner that emulates reality, and as the aircraft navigates (e.g., turns, ascends, descends, rolls, etc.), the graphical representation of object can shift to provide a continuously updated virtual representation of the object for the flight crew.

In an exemplary embodiment, the data source correlation process 300 continues by updating the primary flight display in response to updated data from one of the data sources used in rendering the display (task 314). In other words, the graphical representation of an object and/or the correlated object region is updated in response to either updated sensor data or updated tracking data. For example, in accordance with one embodiment, the sensor system 108 is configured for operation that is effectively real-time, such that the sensor data for the sensing region is updated with a greater frequency than the tracking data. The data source correlation process 300 obtains updated sensor data for the sensing region and rendering a graphical representation of the updated sensor data on the display device overlying the synthetic perspective view of terrain. In this regard, the updated sensor data is rendered in lieu of the previously obtained and/or rendered sensor data, which may subsequently be discarded after updating. In an exemplary embodiment, the data source correlation process 300 analyzes and/or processes the updated sensor data to determine and/or identify whether a subset of the updated sensor data (or region within the updated sensor region) corresponds to a previously identified and/or correlated object region. For example, if the first object 416 is in motion, when the sensor system updates the data for the sensing region 405, the object region 408 corresponding to the first object will have shifted, translated and/or rotated in position relative to the underlying terrain 404. As set forth above, the data source correlation process 300 correlates the tracking data and the sensor data associated with the first object thereby establishing an association between the two, such that in response to displacement and/or rotation of the object region 408, the graphical representation of the first object 416 is displaced and/or rotated in an equivalent manner. As a result, the graphical representation of the first object 416 is repositioned so that it overlaps at least a portion of subset of the updated sensor data that corresponds to the updated and/or displaced object region 408. In this manner, the real-time sensor data may be used to update the positioning of the symbology which was identified based on the tracking data. Thus, even if the sensor data is blurred or smeared from the motion of the first object, the symbology for the first object may be simultaneously rendered on the display and correlated with the real-time sensor data in order to disambiguate the object region.

In a similar manner, in response to receiving and/or obtaining updated tracking data for an object, the data source correlation process 300 may determine updated positional data for the object and render the symbology representative of the object in accordance with the updated positional data (i.e., at the updated position). To maintain the correlation and/or association between the tracking data and the sensor data, the data source correlation process 300 renders the graphical representation of the object region corresponding to the object at an updated position such that the overlapping relationship between the object symbology and the correlated object region is maintained. For example, if the data source correlation process 300 determines that the first object 416 has moved toward the right of the primary flight display 402 based on updated tracking data, the data source correlation process 300 moves the object region 408 in an equivalent manner (e.g., same direction and/or distance) such that the graphical representation of the object region 408 reflects the most recently obtained position information for the first object 416. In this manner, if there is a delay in obtaining the sensor data for the sensing region (e.g., slow refresh rate or temporary lapse in sensor data), the object region rendered in the primary flight display 402 may be updated to reflect more recently updated (and presumably more accurate) position information derived from the tracking data. In a further embodiment, if the tracking data and/or positional data includes speed or velocity information for the object, the known speed and/or velocity of the object may be utilized to update the positioning of both the graphical representations of the object and the correlated object region. For example, if there is a gap or lull in receiving updated sensor data and/or updated tracking data, the speed and/or velocity information may be utilized to update the display for a period of time until updated sensor data and/or updated tracking data is received.

In other words, the data source correlation process 300 associates the symbology that is representative of an object having associated tracking data with the graphical representation of the sensor data corresponding to the object, such that when either the sensor data and/or tracking data is updated, both graphical representations may be updated and/or repositioned to reflect the most recently obtained data and/or information. Thus, the symbology for an object and the graphical representation of the sensor data for the object are effectively fused, such that they are repositioned and/or updated in an equivalent manner based on the most recently updated data source (e.g., the most recently obtained position data and/or information).

To briefly summarize, the methods and systems described above allow relatively noisy or imprecise sensor data to be resolved using symbology that accurately reflects the real-world objects detected by the sensors using identification information provided by tracking data associated with the objects. By correlating tracking data with sensor data, otherwise ambiguous sensor regions may be augmented to provide a more accurate visual representation of the various objects in the field of view, thereby reducing the perceptual processing and mental workload on behalf of the pilot and/or crew. This is particularly useful in situations where the position of other objects and/or vehicles is critical, for example, helicopter landings in reduced visibility or otherwise degraded operating environments, or in situations where the sensor data would otherwise be of limited utility, for example, when objects and/or vehicles are moving such that the sensor data for the objects is blurred or when the sensors have low resolution. The sensor data and symbology may be rendered in an overlapping fashion or using visually distinguishable characteristics (e.g., by varying the transparency and/or color saturation of the layers) or smoothing and filtering the raw sensor image in order to allow a user to maintain the ability to distinguish between the relevant features of the sensor data and the symbology as desired. The display may be updated dynamically in response to either updated sensor data or updated tracking data, such that the display reflects the most recently obtained positional information for an object. As a result, the display more accurately emulates the real-time real-world operating environment.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It being understood that various changes may be made in the function and arrangement of elements described in an exemplary embodiment without departing from the scope of the subject matter as set forth in the appended claims.

What is claimed is:

1. A method for displaying information on a display device associated with a vehicle, the method comprising:
  rendering a perspective view of terrain on the display device, the perspective view of terrain being based on a set of terrain data corresponding to a viewing region proximate the vehicle;
  obtaining sensor data for a sensing region, the sensing region overlapping at least a portion of the viewing region;
  obtaining tracking data associated with a first object located within the sensing region, the tracking data being based on a tracking signal associated with the first object;
  rendering a graphical representation of the first object on the display device overlying the perspective view of terrain;
  correlating a first portion of the sensor data and the tracking data, the first portion of the sensor data corresponding to the first object; and
  updating the positioning of the graphical representation of the first object in response to displacement of the first portion of the sensor data based on the correlation with the first portion of the sensor data.

2. The method of claim 1, further comprising rendering a graphical representation of the sensor data for the sensing region on the display device, the graphical representation of the sensor data being rendered in conjunction with the perspective view of terrain.

3. The method of claim 2, wherein rendering the graphical representation of the first object comprises rendering the graphical representation of the first object overlying the graphical representation of the first portion of the sensor data.

4. The method of claim 2, wherein rendering the graphical representation of the first object comprises rendering the graphical representation of the first object using a symbology that accurately reflects physical characteristics of the first object.

5. The method of claim 2, wherein rendering the graphical representation of the first object comprises rendering the graphical representation of the first object such that it overlaps at least a portion of a graphical representation of the first portion of the sensor data.

6. The method of claim 2, wherein correlating the first portion of the sensor data and the tracking data further comprises:
  determining positional data for the first object;
  determining the first portion of the sensor data corresponds to the first object based on the positional data; and
  associating the tracking data with the first portion of the sensor data.

7. The method of claim 6, wherein updating the positioning of the graphical representation of the first object comprises:
  obtaining updated sensor data for at least a portion of the viewing region;
  determining a second portion of the updated sensor data corresponds to the first portion of the sensor data;
  rendering a graphical representation of the updated sensor data on the display device, the graphical representation of the updated sensor data overlying the perspective view of terrain; and
  rendering the graphical representation of the first object such that the graphical representation of the first object overlaps at least a portion of a graphical representation of the second portion of the updated sensor data.

8. The method of claim 6, further comprising:
  receiving updated tracking data for the first object; and
  determining updated positional data for the first object in response to the updated tracking data;
  rendering the graphical representation of the first object at a position based on the updated positional data; and
  rendering the graphical representation of the first portion of the sensor data such that the graphical representation of the first object overlaps at least a portion of the graphical representation of the first portion of the sensor data.

9. The method of claim 1, wherein rendering the graphical representation of the first object comprises rendering a three-dimensional perspective view of the first object in a conformal manner with respect to the terrain, such that the graphical representation of the first object accurately reflects physical characteristics of the first object.

10. A method for displaying information on a display device associated with an aircraft, the method comprising:

rendering a primary flight display on the display device, wherein the primary flight display comprises a synthetic perspective view of terrain for a viewing region proximate a current location of the aircraft, and wherein the synthetic perspective view of terrain corresponds to a flight deck viewpoint;

obtaining sensor data for a sensing region, the sensing region overlapping at least a portion of the viewing region;

rendering, in a portion of the primary flight display, a graphical representation of the sensing region in conjunction with the synthetic perspective view of terrain;

obtaining tracking data for a first object based on a tracking signal associated with the first object;

in response to the tracking data:
  identifying an object region within the sensing region based at least in part on the tracking data, the object region comprising sensor data indicative of the first object;
  associating the tracking data and the object region; and
  rendering, in a portion of the primary flight display, a first symbology representative of the first object, wherein the first symbology is positioned relative to the synthetic perspective view of the terrain based on the association with the object region, such that the first symbology overlaps at least a portion of the object region;

obtaining updated sensor data for the sensing region, wherein obtaining updated sensor data results in an updated sensing region;

rendering, in a portion of the primary flight display, a graphical representation of the updated sensing region overlying the synthetic perspective view of terrain;

identifying a first region within the updated sensing region that corresponds to the object region; and rendering the first symbology such that the first symbology overlaps at least a portion of the first region of the updated sensing region.

11. The method of claim 10, further comprising determining positional data for the first object, the positional data being based on the tracking signal, wherein identifying the object region comprises identifying the object region based on the positional data.

12. The method of claim 10, wherein associating the tracking data and the object region comprises fusing the first symbology with a graphical representation of the object region.

13. The method of claim 12, further comprising obtaining updated tracking data for the first object, wherein fusing the first symbology and the graphical representation of the object region comprises:
  rendering the graphical representation of the first symbology based on the updated tracking data; and
  rendering the graphical representation of the object region such that the first symbology overlaps at least a portion of the object region.

14. The method of claim 10, wherein rendering the first symbology comprises rendering the first symbology in a conformal manner with respect to the terrain, the first symbology comprising a three-dimensional perspective view of the first object such that the first symbology accurately reflects physical characteristics of the first object.

15. The method of claim 10, wherein rendering the first symbology comprises rendering the first symbology using a visually distinguishable characteristic.

16. A display system for an aircraft, the display system comprising:
  a display device;
  an onboard sensor system configured to obtain sensor data for a first object located within a viewing region proximate the aircraft;
  a communications system configured to obtain tracking data for the first object, the tracking data being based on a tracking signal associated with the first object;
  a processing architecture coupled to the communications system and the onboard sensor system; and
  a graphics system coupled to the processing architecture and the display device, wherein the graphics system and the processing architecture are cooperatively configured to:
    render a primary flight display on the display device, wherein the primary flight display comprises a synthetic perspective view of terrain for the viewing region, and wherein the synthetic perspective view of terrain corresponds to a flight deck viewpoint;
    render, in a portion of the primary flight display, a graphical representation of the sensor data for the first object;
    render, in a portion of the primary flight display, a first symbology overlying the synthetic perspective view of terrain, the first symbology being based on the tracking data such that the first symbology is representative of the first object, wherein the first symbology is positioned overlying the terrain in a manner that is influenced by the sensor data for the first object; and
    in response to updated sensor data obtained by the onboard sensor system for at least a portion of the viewing region:
      render a graphical representation of the updated sensor data overlying the synthetic perspective view of terrain;
      determine a subset of the updated sensor data corresponds to the sensor data for the first object; and
      render the first symbology such that it overlaps at least a portion of a graphical representation of the subset of the updated sensor data.

17. The display system of claim 16, wherein the processing architecture is configured to maintain an association between the tracking data and the sensor data for the first object.

18. The display system of claim 16, wherein:
  the communications system is configured to obtain updated tracking data for the first object; and
  in response to the updated tracking data, the processing architecture and the graphics system are cooperatively configured to:
    render the first symbology overlying the synthetic perspective view of terrain based on the updated tracking data; and
    render a graphical representation of the sensor data for the first object overlying the synthetic perspective view of terrain such that the first symbology overlaps at least a portion of the graphical representation of the sensor data for the first object.

19. A method for displaying information on a display device associated with an aircraft, the method comprising:
  rendering a primary flight display on the display device, wherein the primary flight display comprises a synthetic perspective view of terrain for a viewing region proximate a current location of the aircraft, and wherein the synthetic perspective view of terrain corresponds to a flight deck viewpoint;
  obtaining sensor data for a sensing region, the sensing region overlapping at least a portion of the viewing region;

rendering, in a portion of the primary flight display, a graphical representation of the sensing region in conjunction with the synthetic perspective view of terrain;
obtaining tracking data for a first object based on a tracking signal associated with the first object;
in response to the tracking data:
identifying an object region within the sensing region based at least in part on the tracking data, the object region comprising sensor data indicative of the first object;
associating the tracking data and the object region; and
rendering, in a portion of the primary flight display, a first symbology representative of the first object, wherein the first symbology is positioned relative to the synthetic perspective view of the terrain based on the association with the object region, such that the first symbology overlaps at least a portion of the object region;
obtaining updated tracking data for the first object;
rendering the graphical representation of the first symbology based on the updated tracking data; and
rendering the graphical representation of the object region such that the first symbology overlaps at least a portion of the object region.

\* \* \* \* \*